(No Model.)
D. N. CARVALHO.
Photographic Focusing Frame.
No. 237,246.  Patented Feb. 1, 1881.
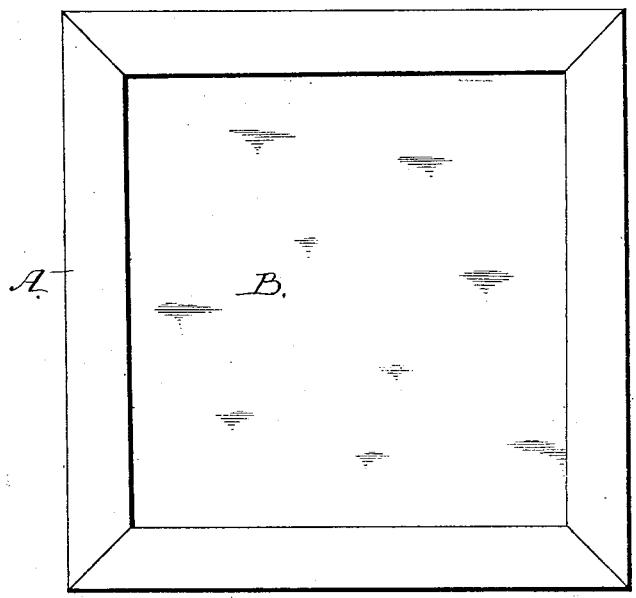
Witnesses:
Chas. C. Gill
F. Walter Fowler
Inventor,
David N. Carvalho,
By his Attys.
Cox and Cox

UNITED STATES PATENT OFFICE.

DAVID N. CARVALHO, OF NEW YORK, N. Y., ASSIGNOR TO THE CELLULOID MANUFACTURING COMPANY, OF SAME PLACE.

PHOTOGRAPHIC FOCUSING-FRAME.

SPECIFICATION forming part of Letters Patent No. 237,246, dated February 1, 1881.

Application filed November 22, 1880. (No model.)

*To all whom it may concern:*

Be it known that I, DAVID N. CARVALHO, of New York, in the county of New York and State of New York, have invented a new and useful Improvement in Photographic Focusing-Frames, of which the following is a specification, reference being had to the accompanying drawing.

The invention relates to improvements in focusing-frames.

It consists, essentially, in the employment of a translucent or transparent sheet of celluloid instead of a pane of ground glass in ordinary use.

Focusing-frames, as heretofore constructed, have been made of ground glass of greater or less thickness, according to the size of the frame. Owing to the refraction of light, and perhaps other causes, it is not possible to obtain a perfectly accurate focus when glass is used, especially because it is absolutely necessary that the image shall strike the sensitive plate in exact focus with the outside of the ground glass formerly used. The most skillful operators always make an allowance for the thickness of the focusing-glass and the refraction caused by it, relying very much upon their judgment and experience. It is also true that the use of the glass frame in high latitudes or in obtaining negatives in the open air during the winter involves many serious difficulties, which have heretofore been productive of great loss and inconvenience.

To obviate these and other objections to the frame in use at present is the object of my invention, which is effected by using a thin opalescent sheet of celluloid instead of the usual pane of glass.

In the accompanying drawing I have shown a face view of a focusing-frame embodying the invention.

A denotes the frame proper, which is of any approved construction, adapted to be placed in the camera in the usual way.

B denotes the transparent part of the frame, and consists of a thin transparent sheet of celluloid or analogous plastic material. The sheet of celluloid can be cut to any degree of thinness, and when cut will not fracture under ordinary usage. In the employment of the sheet of celluloid when focusing there are no reflected back rays from the instrument, and it has been found that a focus is obtained at once and without difficulty.

In the manufacture of the sheet B, I preferably use celluloid, although it is not impossible that there may be several analogous substances which can be employed successfully.

I do not therefore limit my claim to celluloid; but

What I claim is—

A photographic focusing-frame in which the transparent part consists of a sheet of celluloid or other analogous plastic material.

In testimony that I claim the foregoing improvement in focusing-frames of celluloid or analogous plastic material, as above described, I have hereunto set my hand this 12th day of November, 1880.

DAVID N. CARVALHO.

Witnesses:
R. B. LAWRENCE,
CHAS. C. GILL.